United States Patent [19]
Hansell

[11] Patent Number: 5,271,722
[45] Date of Patent: Dec. 21, 1993

[54] AUTOMOTIVE CONTROL SYSTEM FOR HYDROSTATIC PUMPS

[75] Inventor: Jeffrey C. Hansell, Ames, Iowa
[73] Assignee: Sauer Inc., Ames, Iowa
[21] Appl. No.: 2,814
[22] Filed: Jan. 11, 1993
[51] Int. Cl.$^5$ .............................................. F04B 49/00
[52] U.S. Cl. .................................... 417/278; 417/291
[58] Field of Search ..................... 417/278, 291, 315

[56] References Cited

FOREIGN PATENT DOCUMENTS

| | | | |
|---|---|---|---|
| 0438932 | 7/1991 | European Pat. Off. ............ | 417/291 |
| 2247437 | 7/1990 | Fed. Rep. of Germany . | |
| 0018586 | 2/1983 | Japan ................................. | 417/278 |

OTHER PUBLICATIONS

Series 90 Type II Automotive (FIG. A).
Roxroth Automotive (FIG. B).
HP Automotive (FIG. C).

*Primary Examiner*—Richard A. Bertsch
*Assistant Examiner*—Alfred Basichas
*Attorney, Agent, or Firm*—Zarley, McKee, Thomte, Voorhees & Sease

[57] ABSTRACT

An automotive control system for hydrostatic pumps includes a hydraulic circuit with an automotive orifice located upstream of the main hydrostatic loop with replenishing check valves and downstream of the fill pump. The location of the automotive orifice upstream of the check valves isolates system leakage from affecting flow to the automotive orifice. A hydrostatic unit displacement control valve has a drain side connected to the hydraulic circuit downstream of the fill pump and in parallel with the automotive orifice, and has a supply side connected downstream of the automotive control orifice. The input logic of the control valve is reversed to compensate for the greater pressure available to the drain side of the control valve as compared to the supply side. Reversing the input logic of the control valve provides servo control pressures without the need to isolate the control supply from the hydrostatic loop supply.

5 Claims, 3 Drawing Sheets

AUTOMOTIVE CONTROL SYSTEM FOR HYDROSTATIC PUMPS

TECHNICAL FIELD

The present invention relates generally to hydraulic circuitry for transmissions, and more particularly to an improved automotive control system which permits isolation of the displacement control supply from the hydrostatic loop replenishing supply while permitting the supplies to remain common.

BACKGROUND OF THE INVENTION

In traditional automotive control systems, the low pressure servo is referenced to case pressure and the high pressure servo is referenced to the charge pressure prior to (upstream of) the automotive control orifice. In pumps without the automotive control option, the displacement control supply is traditionally common with the supply to the hydrostatic loop replenishing check valves. In units where a common supply is maintained, the common supply causes any flow demand by the hydrostatic loop to alter the input signal to the control. The varying input signal causes the control to have less than optimum, and sometimes unpredictable, performance.

In other systems, the displacement control supply is isolated from the hydrostatic loop replenishing check valves. Such systems use additional valves such as 24 to provide the isolation of the displacement control, and require additional hydraulic passageways to provide the hydraulic connections for the extra valves.

SUMMARY OF THE INVENTION

It is a general object of the present invention to provide an improved automotive control system for hydrostatic pumps where the displacement control supply and hydrostatic loop supply remain common, yet system leakage is isolated from affecting fluid flow to the automotive orifice.

Another object of the present invention is to provide an automotive control system for hydrostatic pumps which permits use of base unit hardware without the need for additional valves or hydraulic connections to isolate the displacement control system from the hydrostatic loop replenishing supply.

The automotive control system for hydrostatic pumps of the present invention includes a hydraulic circuit with an automotive orifice located upstream of the main hydrostatic loop replenishing check valves and downstream of the fill pump. The location of the automotive orifice upstream of the check valves isolates system leakage from affecting flow to the automotive orifice. A hydrostatic unit displacement control valve has a drain side connected to the hydraulic circuit downstream of the fill pump and in parallel with the automotive orifice, and has a supply side connected downstream of the automotive control orifice in parallel with the hydrostatic loop replenishing valves. The input logic of the control valve is reversed to compensate for the greater pressure available to the drain side of the control valve as compared to the supply side. Reversing the input logic of the control valve provides servo control pressures without the need to isolate the control supply from the hydrostatic loop replenishing supply.

DESCRIPTION OF THE PREFERRED EMBODIMENT

Figure 1:
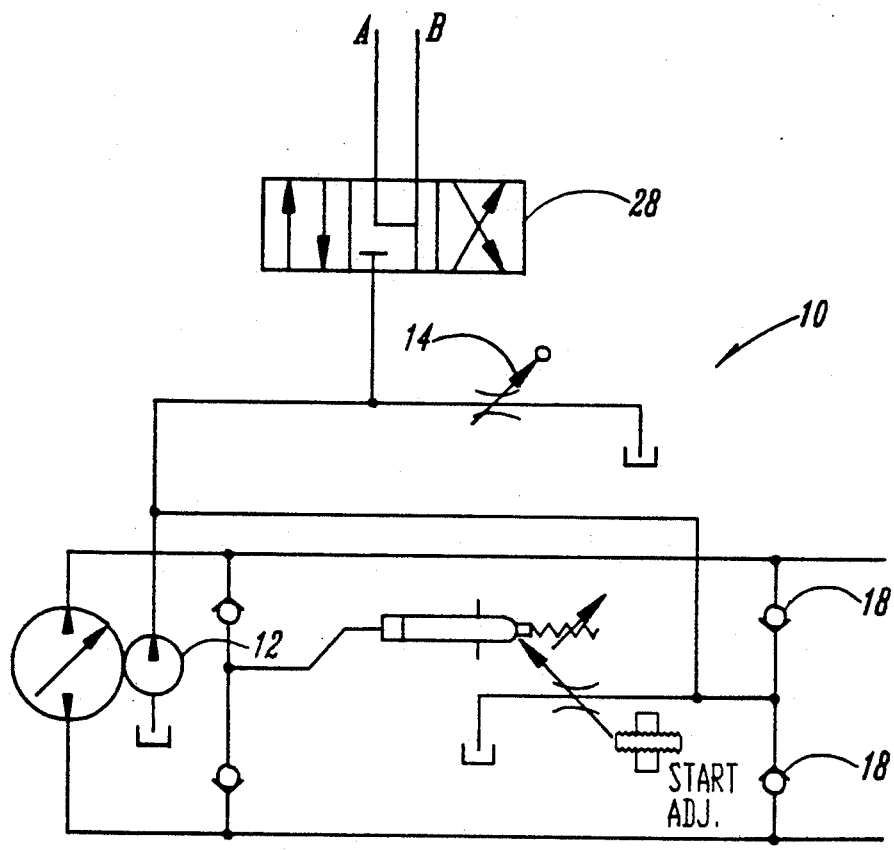
FIG. 1 is a schematic of a prior art automotive control hydraulic circuit.

Referring now to the drawings, in which similar or corresponding parts are identified with the same reference numerals, and more particularly to FIG. 1, one version of an automotive control circuit is designated generally at 10. Control circuit 10 includes a unidirectional fixed displacement fill pump 12 which provides hydraulic fluid to the automotive control orifice 14, the hydrostatic control valve 28 and the hydrostatic loop replenishing valves 18. Periodic flow demands of the hydrostatic loop in circuit 10 divert the flow of hydraulic fluid away from the automotive control orifice 14, which causes the flow signal to be reduced and thereby causes an error in the indication of input speed. For this reason, the flow demand fluctuations of the hydrostatic loop cause erratic automotive control performance.

Figure 2:
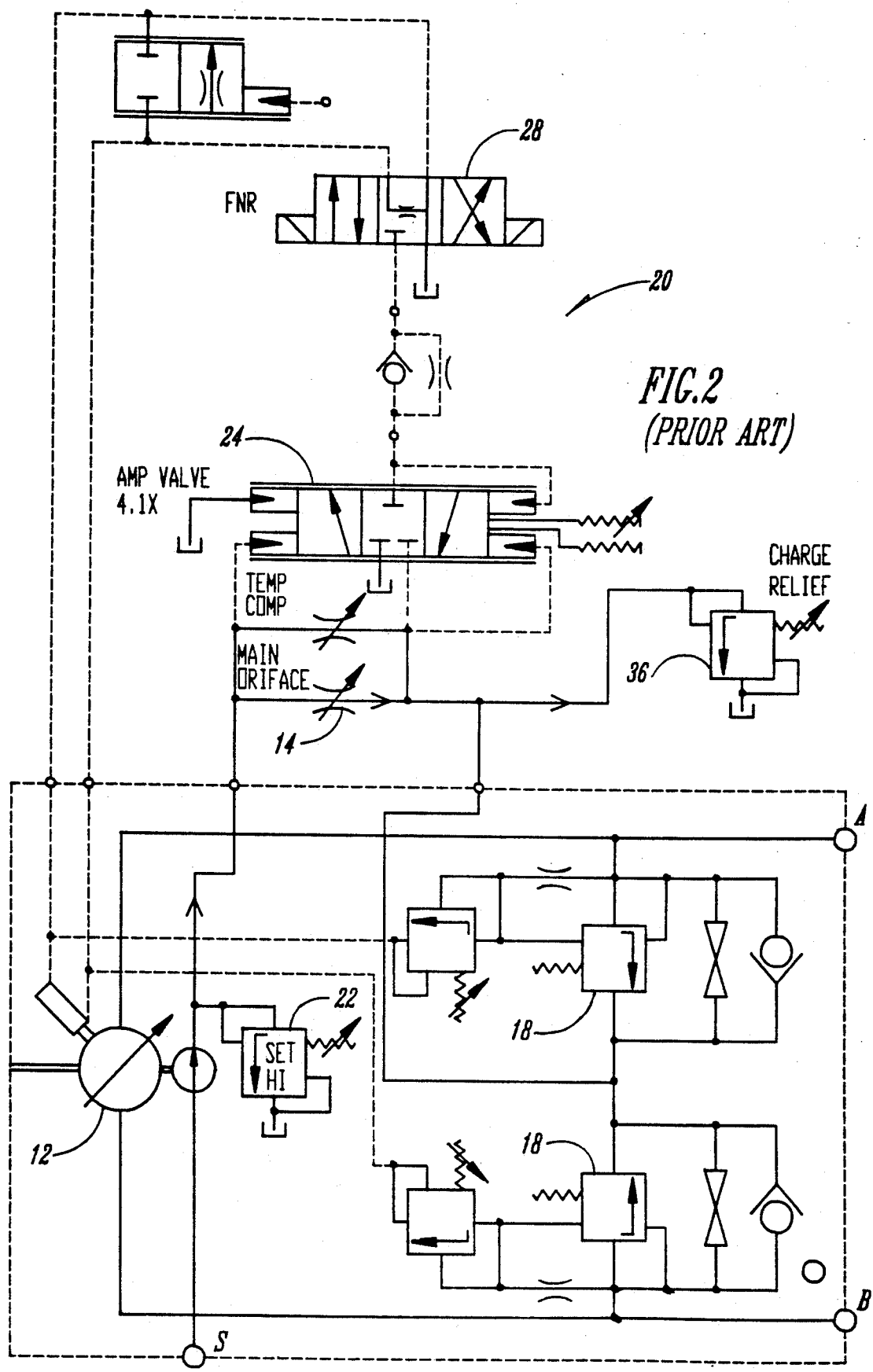
FIG. 2 is a schematic of a second prior art automotive control hydraulic circuit.

Referring now to FIG. 2, a second automotive control circuit is designated generally at 20. Circuit 20 includes a fixed displacement fill pump 12 which provides hydraulic fluid flow to the automotive control orifice 14, an overpressure relief valve 22, and one of the sensing ends on a control pressure amplification valve 24. Flow of hydraulic fluid downstream from the automotive control orifice 14 is made available to the hydrostatic loop replenishing check valves 18, the supercharge regulating valve 36, and the supply port of the amplification valve 24. Output from the amplification valve 24 is made available to the hydrostatic unit displacement control valve 28 through special passages and valves added to this prior art automotive control circuit 20. Thus, the displacement control supply is isolated from the hydrostatic loop by virtue of an additional valve.

Figure 3:
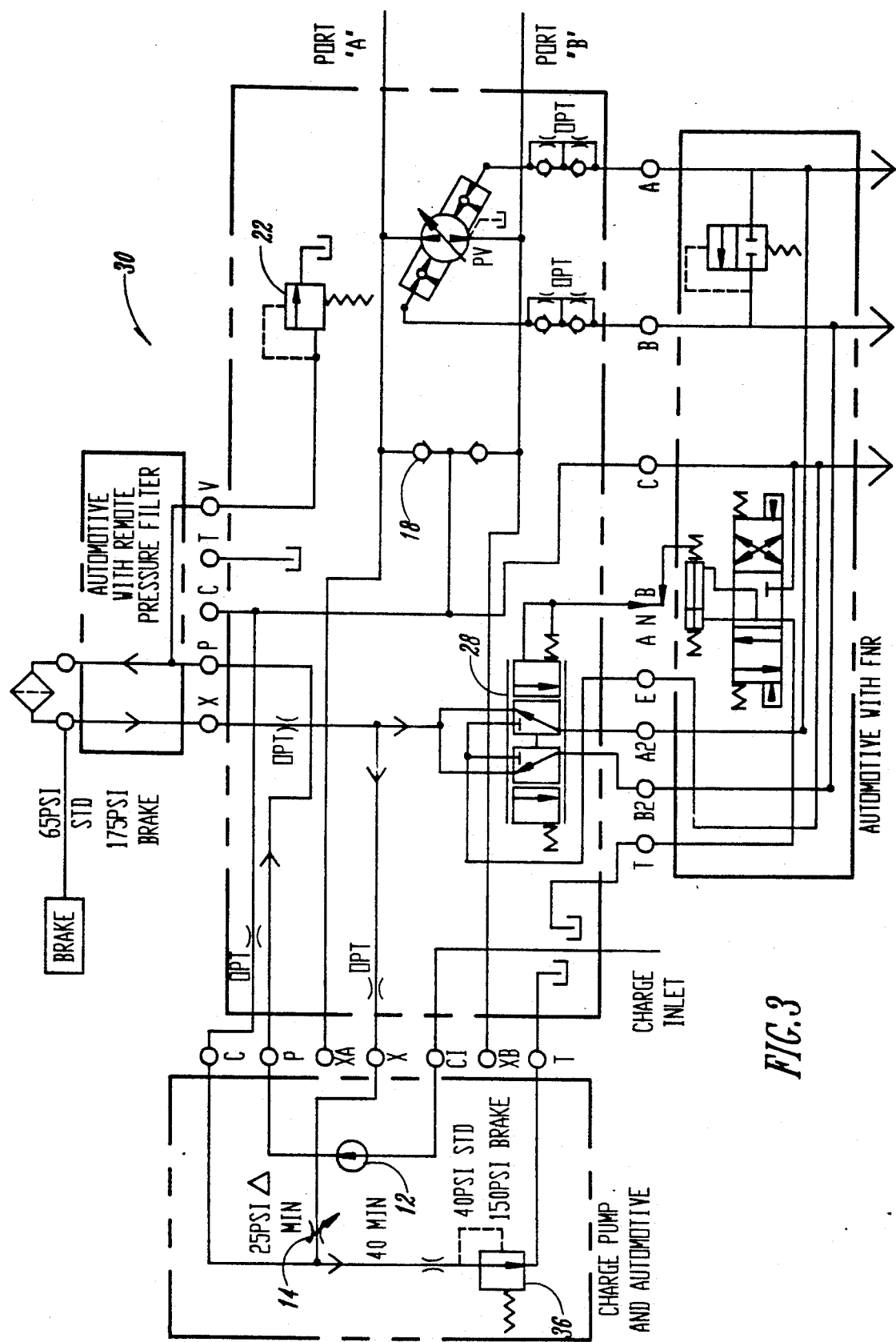
FIG. 3 is a schematic of the automotive control system hydraulic circuit of the present invention.

Referring now to FIG. 3, the automotive control circuit of the present invention is designated generally at 30 and consists of a circuit where the displacement control supply and the hydrostatic loop supply remain common. The fixed displacement supercharge fill pump 12 provides a flow source which is directly related to the rotational speed of the prime mover. Hydraulic fluid from pump 12 is made available to an overpressure relief valve 22, which is otherwise used as a supercharge regulating valve in non-automotive circuits; an automotive control orifice 14, which provides a pressure differential per a predefined relationship with the flow; and the drain side of a hydrostatic unit displacement control valve 28.

Flow of hydraulic fluid downstream from the automotive control orifice 14 is made available to the hydrostatic loop replenishing check valves 18, the supercharge pressure regulating valve 36, and the supply side of the hydrostatic unit displacement control valve 28, utilizing the existing internal passages in the base unit. Because the pressure available to the drain side of control valve 28 is of greater value than the pressure available to the supply side of the valve, the logic of the controlled device is reversed. Reversing the input logic of hydrostatic control valve 28 compensates for the pressure reversal.

It can therefore be seen that reversing the logic of the base displacement control to provide servo control pressures eliminates the need to isolate the control supply from the hydrostatic loop supply. In addition, placement of the automotive orifice upstream of the main loop check valves isolates system leakage from affecting the flow to the orifice and the generated change in a pressure drop, to improve control performance without the need for expensive additional valving and hydraulic connections.

Whereas the invention has been shown and described in connection with the preferred embodiment thereof, it will be understood that many modifications, substitutions and additions may be made which are within the intended broad scope of the appended claims. There has therefore been shown and described an improved automotive control system for hydrostatic pumps which accomplishes at least all of the above stated objects.

I claim:

1. An automotive control system for hydrostatic pumps, including a hydraulic circuit comprising:

a fill pump creating a flow of hydraulic fluid from a charge inlet, downstream to an automotive control orifice;

said hydraulic circuit including a main hydrostatic loop with replenishing check valves, connected to said hydraulic circuit downstream of said automotive control orifice to isolate system leakage from affecting flow to the automotive orifice;

a hydrostatic unit displacement control valve with the drain side connected to said hydraulic circuit downstream of said pump and in parallel with said automotive control orifice;

said control valve having a supply side connected to said hydraulic circuit downstream of said automotive control orifice; and said control valve having input logic which is reversed to compensate for the greater pressure available to the drain side of the control valve as compared to the pressure available to the supply side of said control valve.

2. The automotive control system of claim 1, wherein said automotive control orifice provides a pressure differential per a predetermined relationship with said fluid flow.

3. The automotive control system of claim 1, wherein said hydraulic circuit further comprises a variable pump connected downstream of said check valves, said variable pump having servos connected to said control valve such that said control valve provides servo control pressures without isolating the control supply from the hydrostatic loop supply.

4. The automotive control system of claim 1, wherein said hydraulic circuit further comprises an overpressure relief valve connected downstream of said fill pump in parallel with said automotive orifice.

5. The automotive control system of claim 1, further comprising a supercharge pressure regulating valve connected to said hydraulic circuit downstream of said automotive orifice in parallel with said check valves and the supply side of said control valve.

* * * * *